(12) United States Patent
Ali

(10) Patent No.: US 11,706,614 B2
(45) Date of Patent: Jul. 18, 2023

(54) DIRECT SMF CONTROL PLANE WITH GNB

(71) Applicant: Cisco Technology, Inc., San Jose, CA (US)

(72) Inventor: Irfan Ali, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/377,944

(22) Filed: Jul. 16, 2021

(65) Prior Publication Data
US 2023/0018399 A1    Jan. 19, 2023

(51) Int. Cl.
| | |
|---|---|
| *H04W 12/037* | (2021.01) |
| *H04W 36/00* | (2009.01) |
| *H04W 80/08* | (2009.01) |
| *H04W 76/12* | (2018.01) |
| *H04W 12/0431* | (2021.01) |
| *H04W 12/041* | (2021.01) |
| *H04W 36/08* | (2009.01) |
| *H04W 80/06* | (2009.01) |

(52) U.S. Cl.
CPC ....... *H04W 12/037* (2021.01); *H04W 12/041* (2021.01); *H04W 12/0431* (2021.01); *H04W 36/0038* (2013.01); *H04W 36/08* (2013.01); *H04W 76/12* (2018.02); *H04W 80/06* (2013.01); *H04W 80/085* (2013.01)

(58) Field of Classification Search
CPC .............................................. H04W 8/00–245
See application file for complete search history.

(56) References Cited

U.S. PATENT DOCUMENTS

| | | | |
|---|---|---|---|
| 2018/0227302 A1 | 8/2018 | Lee et al. | |
| 2019/0394683 A1* | 12/2019 | Sillanpaa | H04W 36/32 |
| 2020/0077357 A1 | 3/2020 | Park et al. | |
| 2020/0154320 A1* | 5/2020 | Xu | H04W 36/0011 |
| 2020/0187277 A1* | 6/2020 | Lee | H04W 28/02 |
| 2020/0229042 A1* | 7/2020 | Srivastava | H04W 40/02 |
| 2020/0260520 A1* | 8/2020 | Jin | H04W 76/15 |
| 2020/0359440 A1 | 11/2020 | Qiao et al. | |
| 2020/0374352 A1 | 11/2020 | Ge et al. | |

* cited by examiner

*Primary Examiner* — San Htun
(74) *Attorney, Agent, or Firm* — Polsinelli

(57) ABSTRACT

The disclosed technology separates session management function signaling from the AMF. In particular, an SMF key is created for each SMF following the AMF generating an SM context request that contains gNB information and UE subscription information. Each PDU session creates a direct connection between the SMF and a local gNB. The gNB communicates with each SMF directly over a new interface (N3-C) for session management that is independent of the N2 interface used by the gNB to communicate with the AMF for mobility management. In this way, each SMF independently handles NAS signaling with the UE, using the SMF key and gNB related session-management signaling over an independent interface with the gNB. This removes the burden of relaying these communications through the AMF, which is then freed up to solely to handle mobility management signaling, resulting in an improved architecture.

9 Claims, 9 Drawing Sheets

PDU Session Establishment (2 of 3)

DIRECT SMF CONTROL PLANE WITH GNB

DESCRIPTION OF THE RELATED TECHNOLOGY

Fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities, and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with an Access and Mobility Management Function (AMF)/Mobility Management Entity (MME) for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
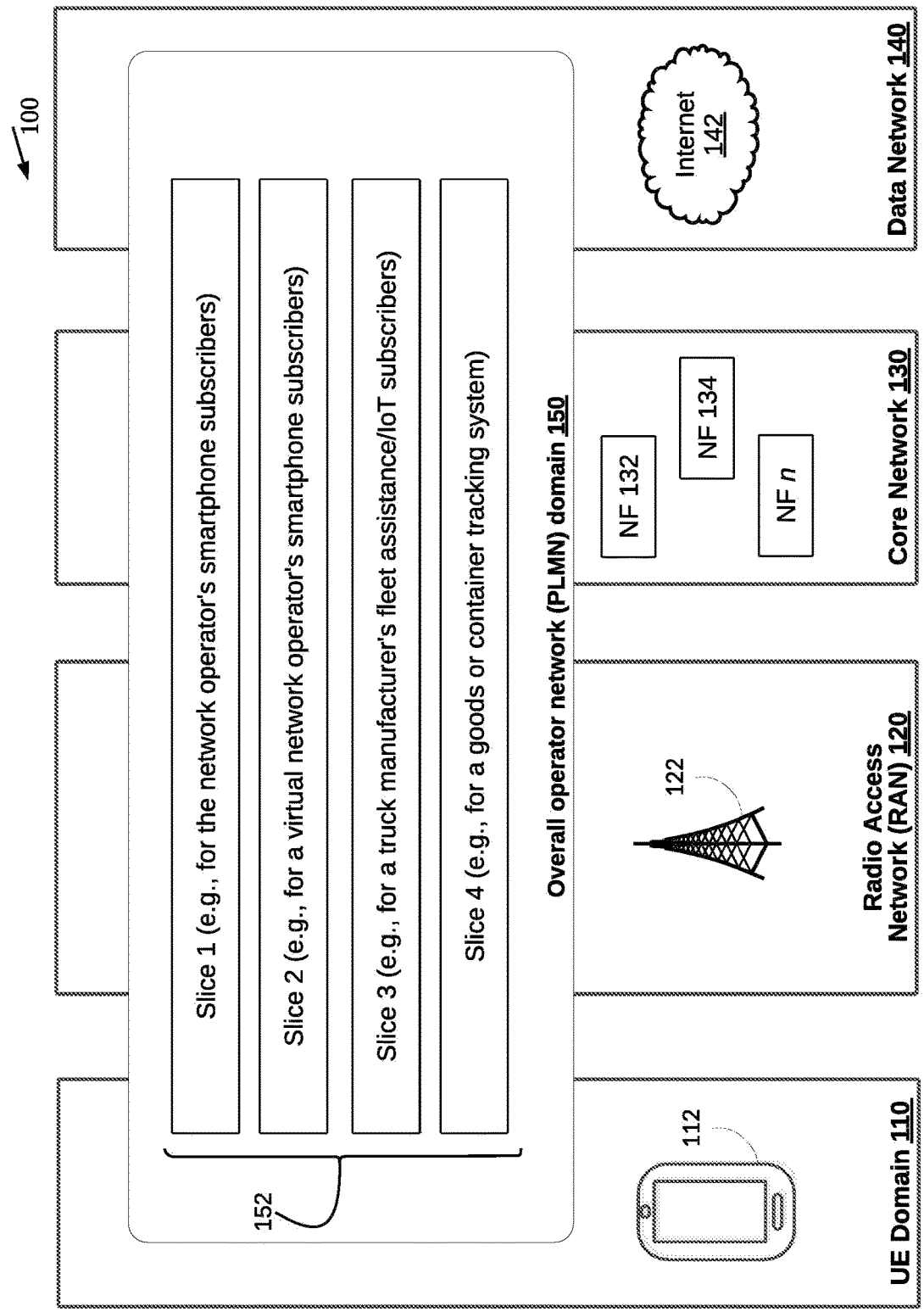
FIG. 1 depicts an example schematic representation of a 5G network environment in which network slicing has been implemented, and in which one or more aspects of the present disclosure may operate according to some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, apparatuses, methods, computer-readable medium, and circuits for establishing a dedicated control plane between a gNB and a session management function (SMF) that is separate from the N2 interface used to communicate with an access mobility function (AMF).

According to at least one example, a method includes receiving, by an SMF, a session request from the UE via the AMF to initiate a protocol data unit (PDU) session between an SMF and a user equipment (UE) through a specified gNB, wherein the session request from the UE includes a PDU session ID. The SMF can request an SMF security key from a security anchor function (SEAF) and receive the SMF security key from the SEAF for use during the PDU session. The SMF can establish a session between the SMF and the gNB over an N3-C interface. The SMF also performs security mode command with the UE to set up security for session management messages based on the key received from the SEAF. Furthermore, session management communications can be handled by the N3-C interface, whereas mobility management communications remain handled by the N2 interface with the AMF. The N3-C interface is a control plane for session management. For example, based on control plane data received from the UE through the gNB over the N3-C interface, the SMF can determine that a session provided by a user plane function (UPF) should be modified, and then send a session modification request to the UPF to modify a parameter of an N3-U tunnel between the gNB and the UPF.

The security key from the SEAF can also be used to secure communications between the UE and the gNB pertaining to session management functions. These communications can be secured by generating a second key from the key received from the SEAF and the PDU Session ID.

In another example, a session management function (SMF) for establishing a dedicated control plane with the gNB is provided that includes storage (e.g., a memory configured to store data, such as virtual content data, one or more images, etc.) and one or more processors (e.g., implemented in circuitry) coupled to the memory and configured to execute instructions and, in conjunction with various components (e.g., a network interface), cause the session management function (SMF) to receive a session request from the UE via the AMF to initiate a PDU session between an SMF and a UE through a specified gNB, wherein the session request from the UE includes a PDU session ID. The SMF can request an SMF security key from a SEAF and receive the SMF security key from the SEAF for use during the PDU session.

The present technology also pertains to a non-transitory computer-readable storage medium having stored therein instructions which, when executed by a processor, cause the processor to receive a session request from the UE via the AMF to initiate a PDU session between an SMF and a UE through a specified gNB, wherein the session request from the UE includes a PDU session ID. The SMF can request an SMF security key from a SEAF and receive the SMF security key from the SEAF for use during the PDU session.

The present technology also pertains to performing a handover from a source gNB to a target gNB in a network wherein the source gNB has a control plane connection to at least one SMF via an N3-C interface. For example, the source gNB can send a handover request to the target gNB and can further send information regarding the at least one SMF and at least on UPF to which the source gNB is communicating to support a PDU session on behalf of a UE to the target gNB. The source gNB can further send a handover command to the UE to detach from the source gNB and attach to the target gNB.

Thereafter the target gNB can communicate with an AMF to move a connection between the AMF and the source gNB to be between the target gNB and the AMF and communicate between the target gNB and the at least one SMF to move a connection over the N3-C interface between the at least one SMF and the source gNB to be between the target gNB and the at least one SMF. The target gNB can also move a connection with at least one UPF associated with the at least one SMF to move an N3-U interface tunnel between the UPF and the source gNB to be between the UPF and the target gNB.

Example Embodiments

The transition from 4G to 5G began a trend of separating mobility management functions from session management functions in a carrier network architecture. Session management functions refer to exchanges between a Session Management Function (SMF) and a user element/equipment (UE). Session management functions can also refer to exchanges between the SMF and a gNB (e.g., a base station). In the 4G architecture, a Mobility Management Entity (MME) handled its namesake mobility management (MM) functions, as well as Non-Access-Stratum (NAS) signaling and session management (SM) functions. In the 5G architecture, NAS signaling and SM functions are moved to the SMF, but these SMF signals are still routed to the UE/gNB through an Access Management Function (AMF). In other words, the separation of SM functions from MM functions in the 5G architecture is incomplete, because SM NAS and SM gNB signaling from the SMF destined for the UE/gNB still passes through an AMF that handles MM functions.

The disclosed technology addresses the need in the art to further separate session management function signaling from the AMF. Session management (SM) functions benefit from encryption to ensure the security of communications to/from the user plane or the UE/gNB. The present technology relates to establishing a Protocol Data Unit (PDU) session via the AMF, which selects an SMF to communicate directly with the gNB or UE. In particular, an SMF key is created for each SMF following the AMF generating an SM context request that contains gNB information and UE subscription information. Each PDU session creates a direct connection between the SMF and a local gNB. Using the SMF key, the gNB communicates with each SMF directly over a new interface (N3-C) that is independent of the N2 interface used by the gNB to communicate with the AMF for mobility management.

In this way, each SMF independently handles NAS signaling with the UE and N3 related signaling over an independent, encrypted interface with the gNB. This removes the burden of relaying these communications through the AMF, which is then freed up to solely to handle MM signaling, resulting in an improved architecture.

While the present technology may result in more connections with the gNB, which the gNB would need to transfer in a handover, the present technology simplifies error handling. Previously, an error in an SMF-related connection was bundled within AMF related connections making errors hard to determine and resolve. By having independent interfaces, troubleshooting and resolving errors by the network is simplified and results in a more efficient network overall.

FIG. 1 depicts an exemplary schematic representation of a 5G network environment 100 in which network slicing has been implemented, and in which one or more aspects of the present disclosure may operate. As illustrated, network environment 100 is divided into four domains, each of which will be explained in greater depth below; a User Equipment (UE) domain 110, e.g. of one or more enterprise, in which a plurality of user cellphones or other connected devices 112 reside; a Radio Access Network (RAN) domain 120, in which a plurality of radio cells, base stations, towers, or other radio infrastructure 122 resides; a Core Network 130, in which a plurality of Network Functions (NFs) 132, 134, . . . , n reside; and a Data Network 140, in which one or more data communication networks such as the Internet 142 reside. Additionally, the Data Network 140 can support SaaS providers configured to provide SaaSs to enterprises, e.g. to users in the UE domain 110.

Core Network 130 contains a plurality of Network Functions (NFs), shown here as NF 132, NF 134 . . . NF n. In some embodiments, the core network 130 is a 5G core network (5GC) in accordance with one or more accepted 5GC architectures or designs. In some embodiments, the core network 130 is an Evolved Packet Core (EPC) network, which combines aspects of the 5GC with existing 4G networks. Regardless of the particular design of core network 130, the plurality of NFs typically execute in a control plane of the core network 130, providing a service-based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of the core network 130 can include one or more Access and Mobility Management Functions (AMF; typically used when core network 130 is a 5GC network) and Mobility Management Entities (MME; typically used when core network 130 is an EPC network), collectively referred to herein as an AMF/MME for purposes of simplicity and clarity. In some embodiments, an AMF/MME can be common to or otherwise shared by multiple slices of the plurality of network slices 152, and in some embodiments, an AMF/MME can be unique to a single one of the plurality of network slices 152.

The same is true of the remaining NFs of the core network 130, which can be shared amongst one or more network slices or provided as a unique instance specific to a single one of the plurality of network slices 152. In addition to NFs comprising an AMF/MME as discussed above, the plurality of NFs of the core network 130 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 100, an overall operator network domain 150 is defined. The operator network domain 150 is in some embodiments a Public Land Mobile Network (PLMN) and can be thought of as the carrier or business entity that provides cellular service to the end-users in UE domain 110. Within the operator network domain 150, a plurality of network slices 152 are created, defined, or otherwise provisioned to deliver the desired set of defined features and functionalities, e.g. SaaSs, for a certain use case or corresponding to other requirements or specifications. Note that network slicing for the plurality of network slices 152 is implemented in an end-to-end fashion, spanning multiple disparate technical and administrative domains, including management and orchestration planes (not shown). In other words, network slicing is performed from at least the enterprise or subscriber edge at UE domain 110, through the Radio Access Network (RAN) 120, through the 5G access edge and the 5G core network 130, and to the data network 140. Moreover, note that this network slicing may span multiple different 5G providers.

For example, as shown here, the plurality of network slices 152 include Slice 1, which corresponds to smartphone subscribers of the 5G provider who also operates network domain, and Slice 2, which corresponds to smartphone subscribers of a virtual 5G provider leasing capacity from the actual operator of network domain 150. Also shown is Slice 3, which can be provided for a fleet of connected vehicles, and Slice 4, which can be provided for an IoT goods or container tracking system across a factory network or supply chain. Note that these network slices 152 are provided for purposes of illustration, and in accordance with the present disclosure, and the operator network domain 150 can implement any number of network slices as needed, and can implement these network slices for purposes, use cases, or subsets of users and user equipment in addition to those listed above. Specifically, the operator network domain 150 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities, and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, an enterprise/subscriber should associate already procured SaaSs and SaaS providers with network slices being used to provision the SaaSs to the enterprise. However, associating SaaSs and SaaS providers with network slices is extremely difficult to achieve without federation across enterprises, network service providers, e.g. 5G service providers, and SaaS providers.

Figure 2:
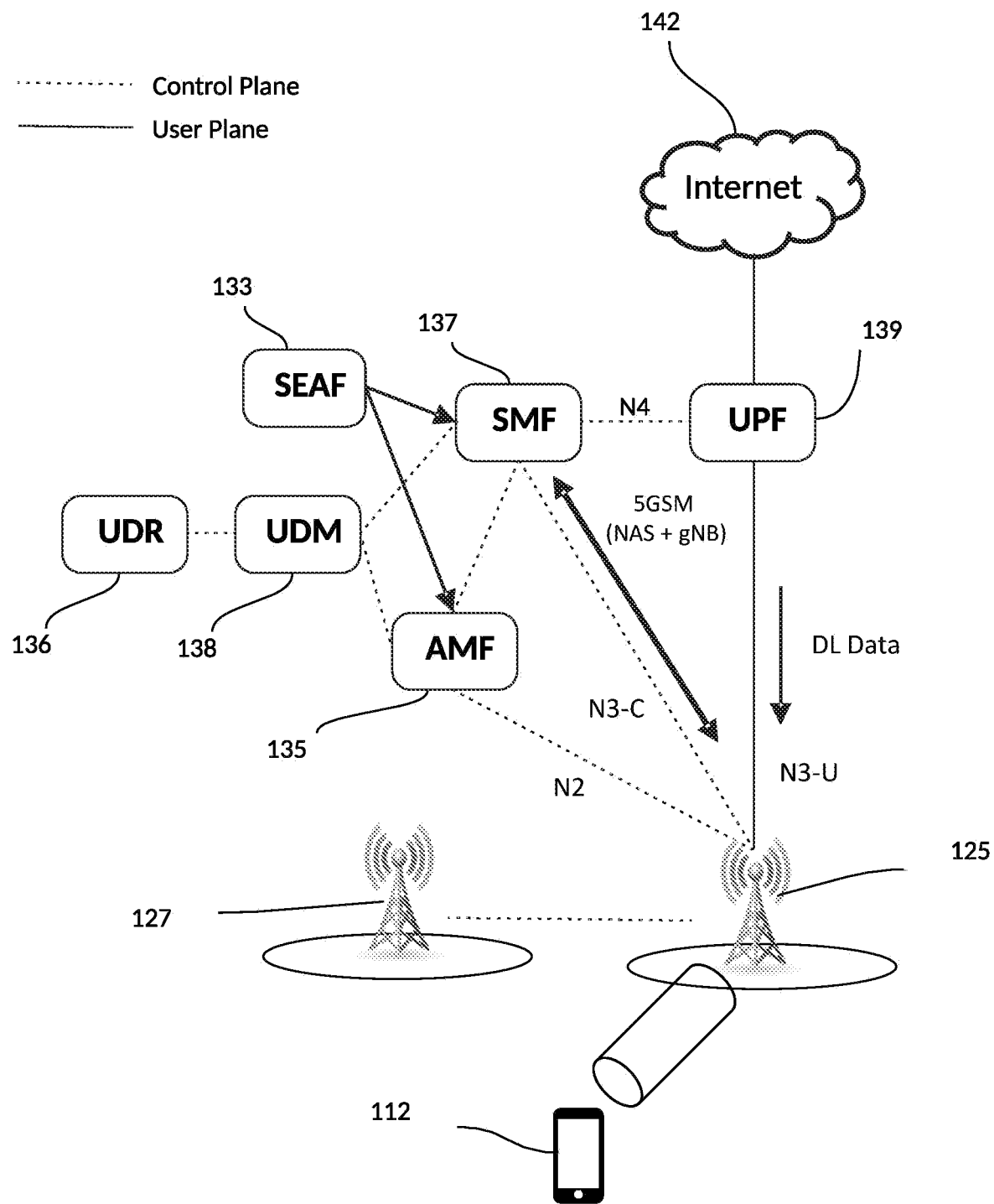
FIG. 2 illustrates an example 5G network architecture according to some embodiments of the present technology.

FIG. 2 illustrates an example 5G network architecture. As addressed above, a User Equipment (UE) 112 can connect to a radio access network provided by a first gNodeB (gNB) 125 or a second gNB 127.

The gNB 125 can communicate over a control plane N2 interface with an access mobility function (AMF) 135. AMF 135 can handle tasks related to network access through communication with a unified data management (UDM) function 138 which accesses a user data repository (URD) 136 that can contain user data such as profile information, authentication information, etc. Collectively AMF 135 and UDM 138 can determine whether a UE should have access and any parameters on access. AMF 135 also works with SEAF 133 to handle authentication and re-authentication of the UE 112 as it moves between access networks. The SEAF and the AMF could be separated or co-located.

Assuming AMF 135 determines the UE 112 should have access to a user plane to provide voice or data communications, AMF 135 can select one or more service management functions (SMF) 137. SMF 137 can configure and control one or more user plane functions (UPF) 139. Control plane communications between the SMF 137 and the gNB 125 (or 127) also need to be encrypted. SEAF 133 can provide a security key to SMF 137 for use in encrypting control plane communications between the SMF 137 and the gNB 125 (or 127).

As noted above SMF 137 can configure and control one or more user plane functions (UPF) 139. SMF 137 communicates with UPF 139 over an N4 Interface which is a bridge between the control plane and the user plane. SMF 137 can send PDU session management and traffic steering and policy rules to UPF 139 over the N4 interface. UPF 139 can send PDU usage and event reporting to SMF 137 over the N4 interface.

UPF 139 can communicate user plane data or voice over the N3 interface back to UE 112 through gNB 125. There can be any number of UPFs handling different user plane services. Most commonly there would be at least one UPF for data service and at least one UPF for voice service.

Figure 3:
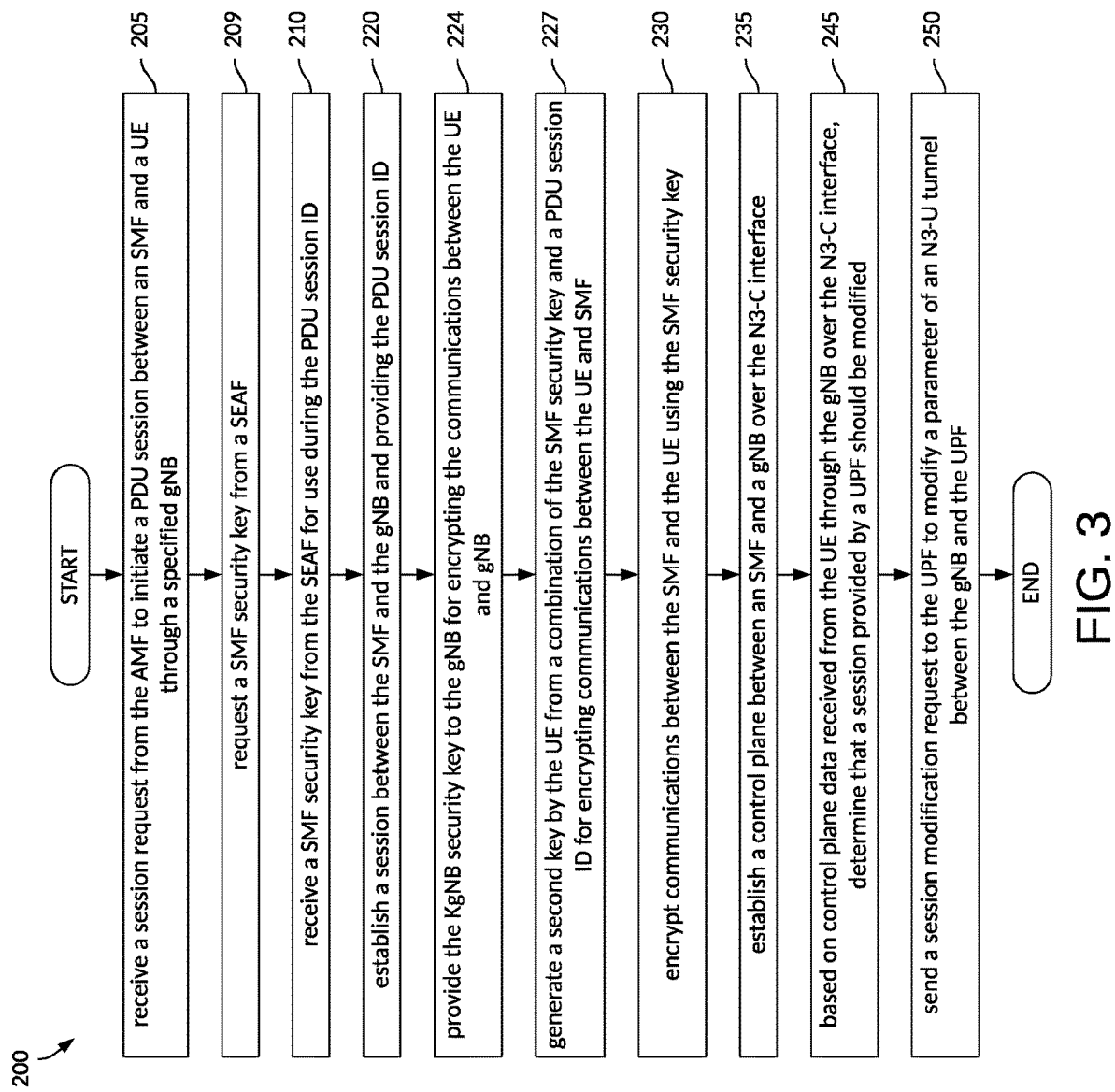
FIG. 3 illustrates an example method for establishing a control plane between an SMF and a gNB that is separate from the N2 interface utilized by AMF, and encrypting the communications over that control plane with a security key provided by a SEAF according to some embodiments of the present technology.

FIG. 3 illustrates an example method 200 for establishing a control plane between SMF 137 and gNB 125 that is separate from the N2 interface utilized by AMF 135. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

Figure 4A:
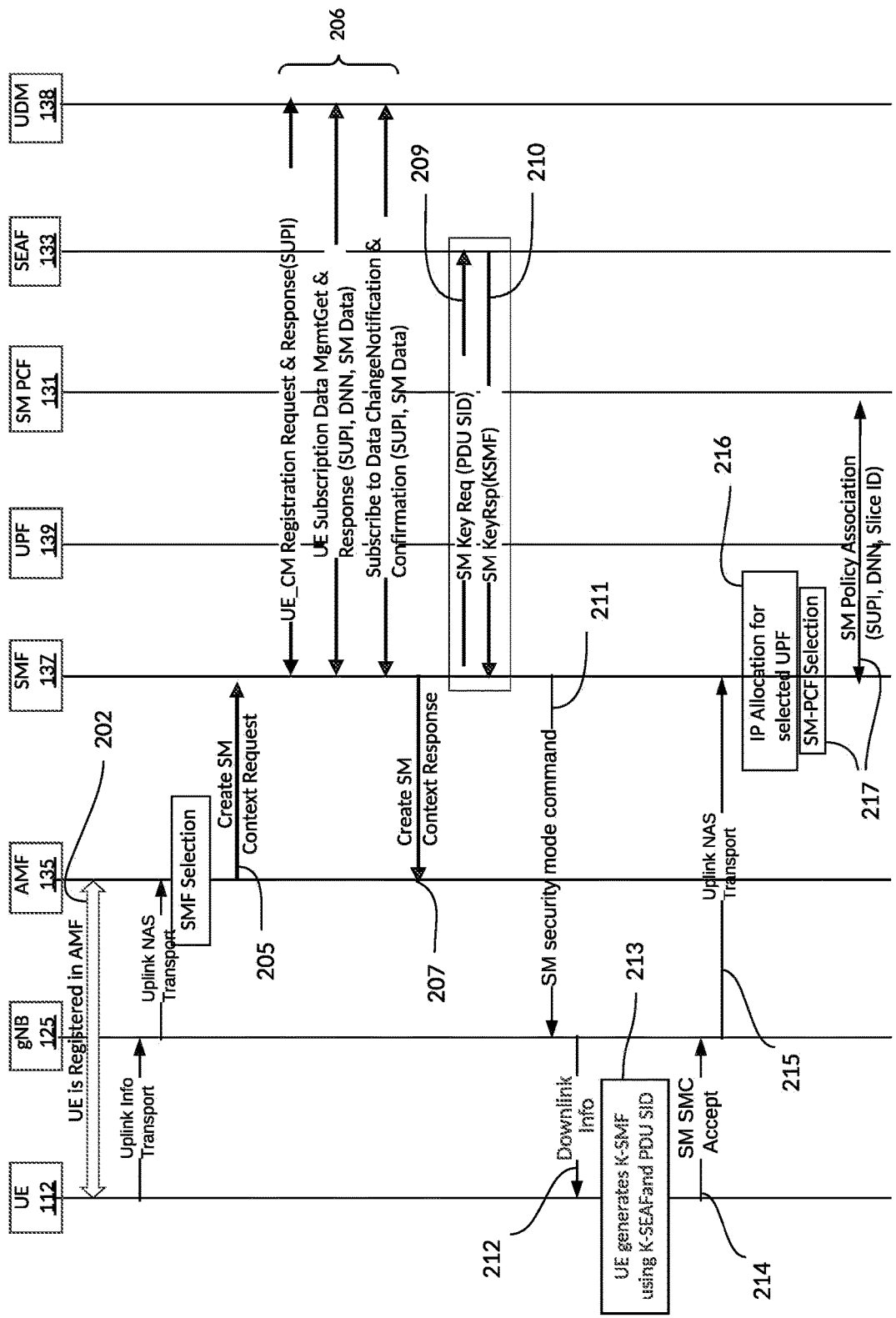
FIGS. 4A, 4B, and 4C collectively illustrate an example sequence diagram for the establishment of a PDU session according to some embodiments of the present technology.
Figure 4B:
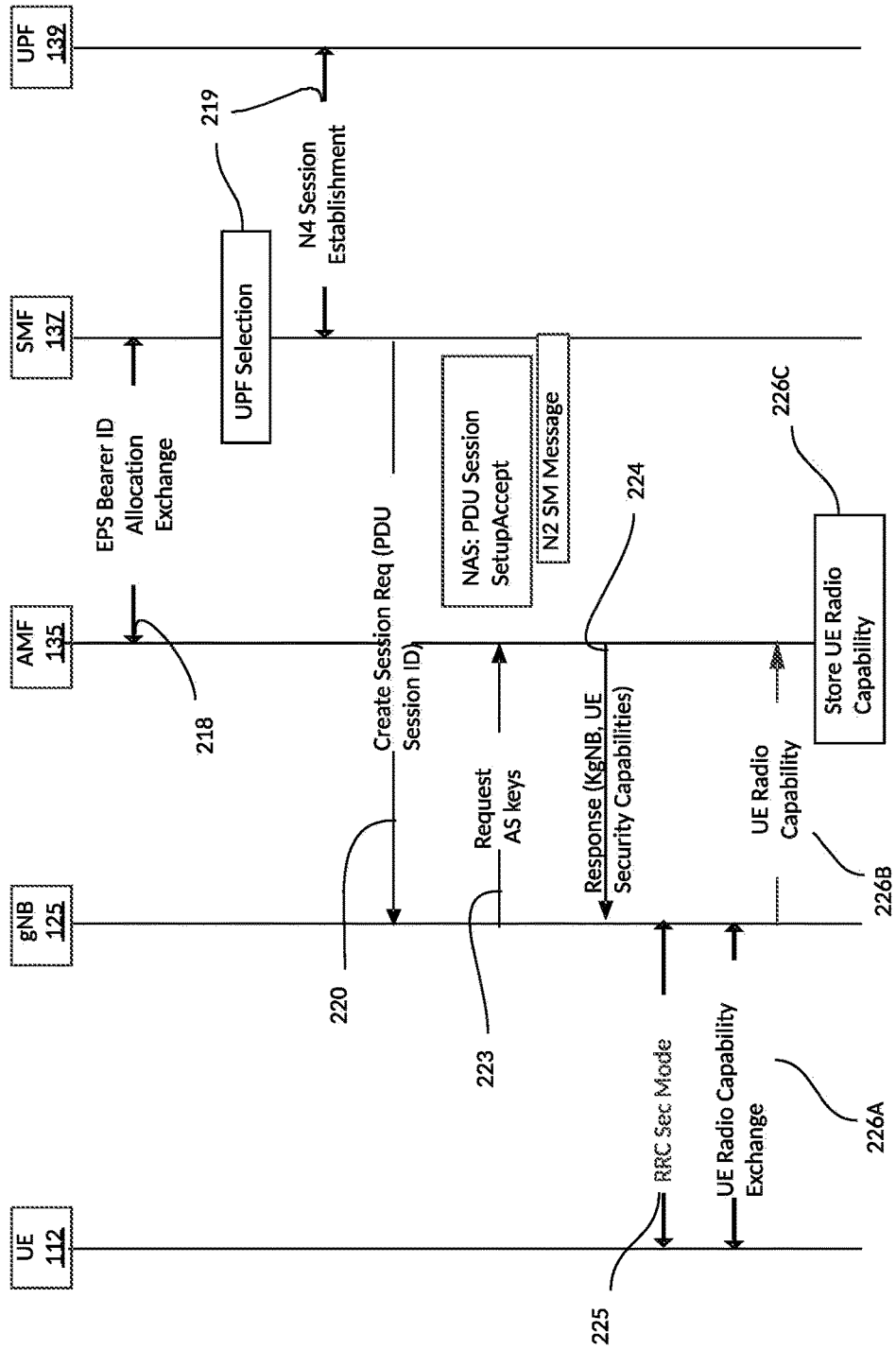
Figure 4C:
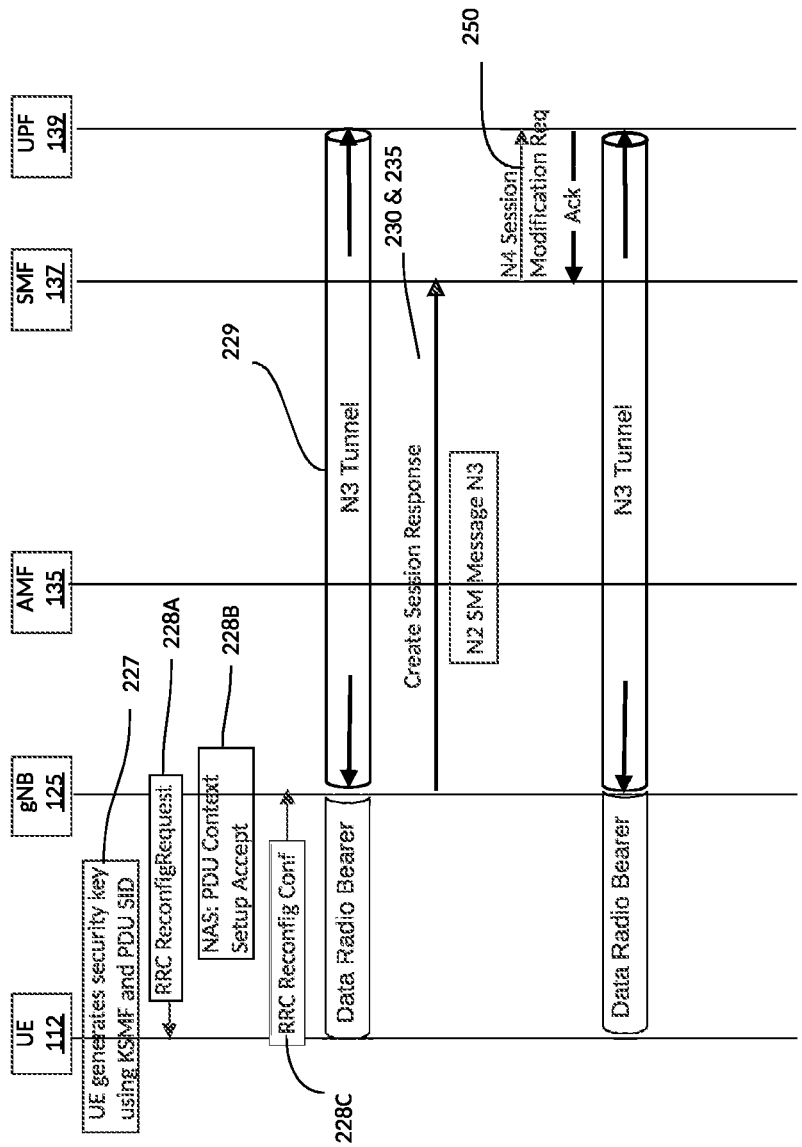

Method 200 illustrated in FIG. 3 will also be discussed in the context of FIGS. 4A, 4B, and 4C, which collectively illustrate a sequence diagram for the establishment of a PDU session. Steps specific to the present technology illustrated in method 200 are present throughout FIGS. 4A, 4B, and 4C.

As illustrated in FIG. 4A, UE 112 can become registered 202 with AMF 135. The UE sends a "PDU Session Establishment Request" 202 via the gNB to the AMF. This message includes a PDU session ID. UE 112 provides the "PDU Session Establishment Request" message in uplink transport information to gNB 125, and gNB 125 relays this in the uplink NAS transport information to AMF 135.

Thereafter, AMF 135 can make a selection of an SMF 137 based on the parameters provided by the UE and subscription information that the AMF had received from the UDM during the registration procedure.

As illustrated in FIG. 4A, SMF 137 can exchange several communications 206 with UDM 138 to register UE 112, ensure the UE 112 has a subscription status with a carrier to permit the use of a UPF and policies associated therewith.

The SMF 137 can send a session management context response 207 (responding to the create session management context request 205) to AMF 135 informing AMF 135 that the session management context was successfully created.

According to some embodiments, the method includes requesting, by the SMF, an SMF security key from a SEAF at block 209. For example, the SMF 137 may request an SMF security key (K-SMF) from the SEAF 133. The request for the SMF security key from the SEAF includes the PDU ID. The PDU Session ID is used to ensure that the keys generated for this PDU session are different from those for another PDU session of the UE. SEAF 133 can derive the SMF security key (K-SMF) from the SEAF security key (K-SEAF), PDU Session ID and a key derivation function to yield the SMF security key (K-SMF).

According to some embodiments, the method includes receiving, by the SMF, an SMF security key from the SEAF for use during the PDU session ID at block 210. For example, the SMF 137 may receive an SMF security key from the SEAF 133 for use during the PDU session.

The SMF 137 then sets up the SM NAS security between the SMF 137 and the UE 112 in steps 211 through 215. The SMF 137 sends 211 an SM security mode command (SMC) to the UE 112 via the gNB 125 which includes the selected security algorithms and the UE security capabilities. This message is integrity protected with K-SMF. This message also establishes the N3-C connection between the SMF 137 and the gNB 125. The gNB 125 relays 212 this SM NAS message to the UE 112 in DL Information Transport message.

The UE 112 independently derives 213 K-SEAF using the same key derivation function as used in the network by SEAF 133 to derive K-SMF from K-SEAF and the PDU ID. The UE 112 verifies the integrity protection of the SM SMC request message.

Once the SM SMC request message is verified by the UE 112, the UE 112 sends the SM SMC Accept message 214 to the gNB 125. The SM SMC accept message is encrypted and integrity protected using the K-SMF key. The UE 112 also in the access stratum level provides an indication to the gNB 125 to enable the gNB 125 to differentiate SM NAS messages, which needs to be forwarded to the SMF 137, from MM NAS messages, which need to be forwarded to AMF 135. The UE 112 also provides PDU session ID along with the SM NAS message to enable differentiation between different SM NAS connections of the UE 112.

The gNB forwards 215 the SM NAS message to the SMF 137 in UL NAS transport. Once the SMF 137 correctly decrypts the SM SMC message, the SMF 137 verifies that encryption and integrity protection has been setup for NAS SM connection with the UE 112.

The SMF 137 can then allocate an IP address 216 that is selected from a pool of IP addresses that correspond to the selected UPF 139 that will anchor the PDU session.

The SMF 137 can also select and send 217 policy information. More specifically, SMF 137 can select a SM policy control function 131 and associate any policies with the session by sending session information to the SM policy control function 131.

As illustrated in FIG. 4B, the AMF 135 and the SMF 137 can also exchange an evolved packet system (EPS) ID 218. The EPS ID can be especially helpful in voice user plane functions to fall back to an EPS network when 5G coverage is not available.

The SMF 137 can then select a UPF and establish 219 a control plane (N4) interface with UPF 139. The N4 Interface is a bridge between the control plane and the user plane. SMF 137 can send PDU session management and traffic steering and policy rules to UPF 139 over the N4 interface. UPF 139 can send PDU usage and event reporting to SMF 137 over the N4 interface.

According to some embodiments, the method includes establishing, by the SMF 137, a session between the SMF 137 and the gNB 125 and providing the PDU session ID at block 220. The Create Session request 220 consists of two parts: (a) a NAS message that is sent to the UE that is encrypted and integrity protected using the SMF security key (K-SMF), and (b) a message to the gNB to setup the appropriate radio bearers for the UE for this PDU session.

The gNB 125 can then request 223 a security key from AMF 135 for encrypting and integrity protecting messages between the UE and the gNB. According to some embodiments, the method includes providing to the gNB the KgNB for use in encrypting communications between the gNB and the UE at block 224. The UE will independently derive KgNB as part of step 225 below.

The gNB 125 can then exchange security protocol information as part of a security mode command and response to inform the UE of the selected encryption and integrity protection algorithms to be used for both the radio resource control (RRC) security settings 225 and data radio bearers.

After the gNB 125 has established secure a RRC channel with the UE using the derived KgNB, the gNB 125 and the UE 112 can exchange 226A information about the radio capabilities of the UE, and the gNB can forward 226B the UE radio capability information to the AMF 135 which stores 226C the UE radio capability information.

As illustrated in FIG. 4C, next in the PDU session establishment flow, the UE can take steps necessary to communicate directly with the SMF 137 with communications encrypted using K-SMF and the PDU SID in step 227.

The gNB can reconfigure 228A the RRC to setup the data radio bearer for the PDU session. This message also includes the PDU Context Setup Accept message from the SMF which is encrypted and integrity protected using K-SMF. UE 112 can then confirm 228C that it has reconfigured the RRC in a communication to the gNB 125.

With the security protocols, encryption keys, and IP addresses distributed between the various entities that are part of the PDU session, the UE 112, communicating through the gNB 125 can establish 229 an N3-U (N3-User Plan) interface with the UPF 139 to handle user plan data or voice traffic.

According to some embodiments, the method includes encrypting NAS communications between the SMF and the UE using the SMF security key at block 230. For example, the SMF 137 and UE 112 may encrypt communications between each other over the N3-C interface using the SMF security key (K-SMF). The N3-C interface is a control plane interface established 235 between the SMF 137 and the UE 112. The SMF security key (K-SMF) is used to encrypt communications on the control plane. Such a dedicated control plane provides a benefit of separating session management data that is the domain of the SMF 137 from access and mobility management data that is the domain of the AMF 135.

Additionally, the SMF security key (K-SMF) is used to create secure access stratum (AS) communications between the UE and the gNB.

According to some embodiments, the method includes, determining that an N4 session provided by a UPF should be modified based on control plane data received from the UE 112 through the gNB 125 over the N3-C interface at block 245. For example, the SMF 137 may determine that an N3-U session provided by a UPF should be modified based on control plane data received from the UE 112 through the gNB 125 over the N3-C interface.

The determination that the N3-U session should be modified, can lead to sending a session modification request to the UPF 139 to modify a parameter of a UPF 139 or an N3-U tunnel between the gNB 125 and the UPF 139 at block 250. For example, the SMF 137 may send a session modification request 250 to the UPF 139 to modify a parameter of the UPF 139 or the N3-U tunnel between the gNB 125 and the UPF 139.

Figure 5:
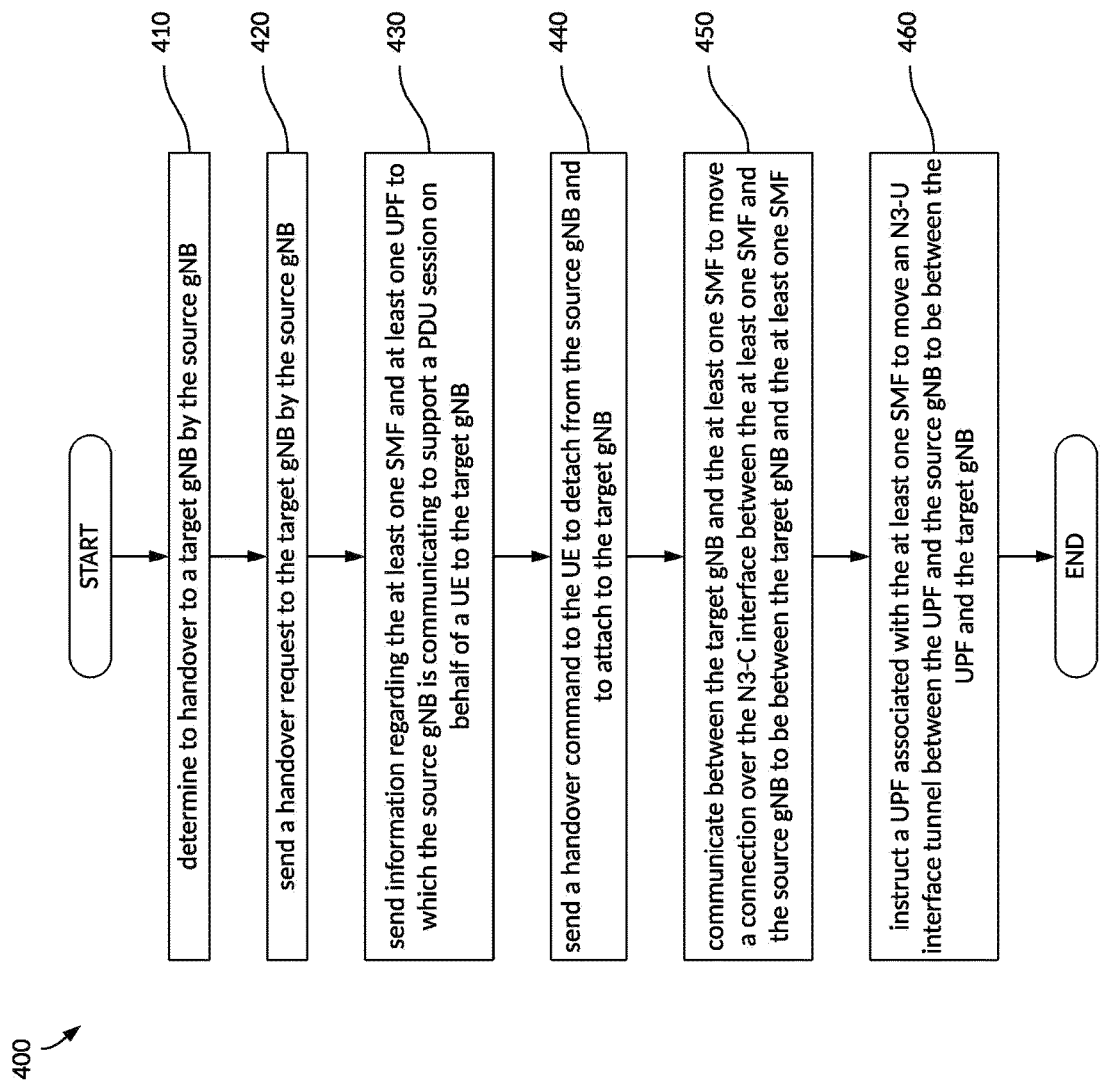
FIG. 5 illustrates an example method for handover by one gNB to another gNB of a PDU session with a UE according to some embodiments of the present technology.

FIG. 5 illustrates an example method 400 for handover by one gNB to another gNB of a PDU session with a UE. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

Figure 6:
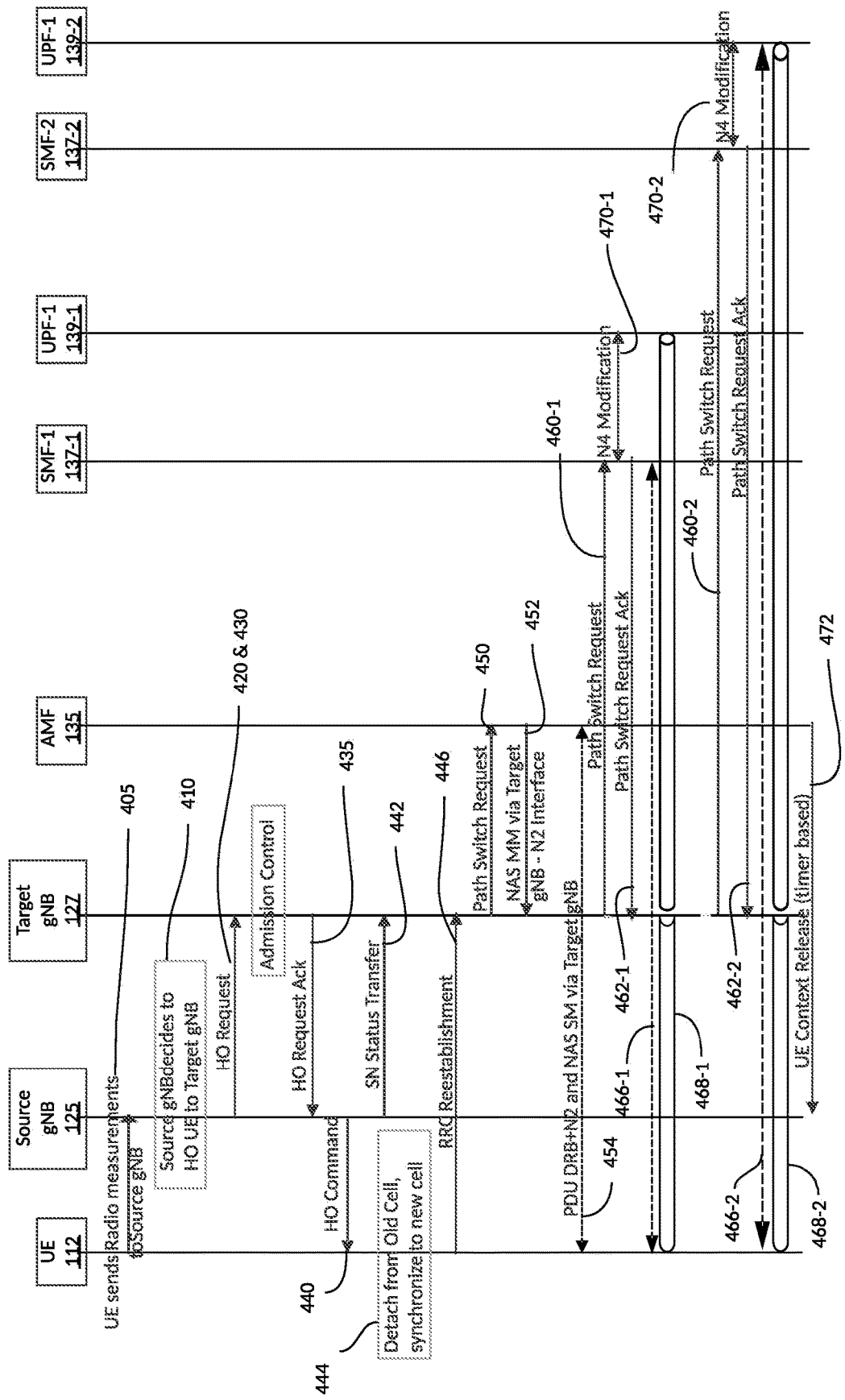
FIG. 6 illustrates an example sequence diagram for the handover by one gNB to another gNB of a PDU session with a UE according to some embodiments of the present technology.

Method 400 illustrated in FIG. 5 will also be discussed in the context of FIG. 6, which illustrates a sequence diagram for the handover by one gNB to another gNB of a PDU session with a UE. Steps specific to the present technology illustrated in method 400 are present throughout FIG. 6.

Throughout its connection to the gNB 125 the UE 112 sending 405 radio measurements to the gNB 125. According to some embodiments, the method includes determining to handover a UE to a target gNB by the source gNB at block 410. For example, the source gNB 125 may determine to handover the UE 112 to a target gNB 127 when the radio measurements received from the UE 112 indicate a target gNB 127 can be a better access point for the UE 112.

According to some embodiments, the method includes sending a handover request to the target gNB 127 by the source gNB 125 at block 420.

According to some embodiments, the method includes sending information regarding the at least one SMF 137-1 and/or 137-2 and at least one UPF 139-1 and/or 139-2 to which the source gNB 125 is communicating to support a PDU session on behalf of the UE 112 to the target gNB 127 at block 430. The target gNB 127 can receive these communications and acknowledge 435 the handover.

According to some embodiments, the method includes sending a handover command to the UE 112 to detach from the source gNB 125 and to attach to the target gNB 127 at block 440. The source gNB 125 can further send 442 status information regarding the handover to the target gNB 127.

The UE 112 can then detach 444 from the source gNB 125 and attach to the target gNB 127 by reestablishing 446 the radio resource control with the target gNB 127.

Once the UE 112 is connected to the target gNB 127, the target gNB 127 can begin moving the AMF, SMF, and UPF interfaces to communicate with UE 112 through the target gNB 127.

According to some embodiments, the method includes communicating between the target gNB 127 and the AMF 135 to move a connection between the AMF 135 and the source gNB 125 to be between the target gNB 127 and the AMF 135 at block 450. For example, target gNB 127 can send a source switch request 450 to AMF 135.

The AMF can respond 452 configuring the N2 interface for the non-access stratum for mobility management, which can result in the establishment 454 of the N2 control plane.

According to some embodiments, the method includes communicating between the target gNB 127 and the at least one SMF 137-1 and/or 137-2 to move a connection over the N3-C interface between the at least one SMF 137-1 and/or 137-2 and the source gNB 125 to be between the target gNB 127 and the at least one SMF 137-1 and/or 137-2 at block 460. For example, in FIG. 6, the UE 112 is connected to both SMF 137-1 and 137-2 and as such message 460-1 is sent to SMF 137-1 and 460-2 is sent to SMF 137-2.

The message 460 to the at least one SMF 137-1 and/or 137-2 can result in sending a modification request to the respective UPF (UPF-1 139-1 and/or UFP-2 139-2) over the N4 interface at block 470. In FIG. 6, both SMF 137-1 and 137-2 send message 470 to their respective UPF (470-1 to UPF-1 and 470-2 to UPF-2).

The SMFs further acknowledge the path switch request. In FIG. 6, SMF 137-1 sends acknowledgment 462-1 and SMF 137-2 sends acknowledgment 462-2 to the target gNB 127.

The result of the path switch is a new control plane N3-C 466 is established between the SMF and the target gNB 127. For example, N3-C is 466-1 is established between SMF-1 and the target gNB 127 and N3-C is 466-2 is established between SMF-2 and the target gNB 127.

According to some embodiments, the method includes instructing a UPF 139-1 and/or 139-2 associated with the at least one SMF 137-1 and/or 137-2 to move an N3-U interface tunnel between the UPF 139-1 and/or 139-2 and the source gNB 125 to be between the UPF 139-1 and/or 139-2 and the target gNB 127 at block 470. For example, N3-U is 468-1 is established between UPF-1 and the target gNB 127 and N3-U is 468-2 is established between UPF-2 and the target gNB 127.

Finally, the AMF 135 can release 472 the source gNB 125 after enough time has passed to complete the handover.

While the method 400 can result in extra communications from the target gNB 127 to move the extra connections, the N3-C interface, in particular, efficiencies are gained in instances where an error occurs. In method 400 the communications pertaining to access and mobility management are separate from session management functions. This separation simplifies error detection and correction when an error occurs pertaining to session management functions since separate interfaces carry separate data.

Figure 7:
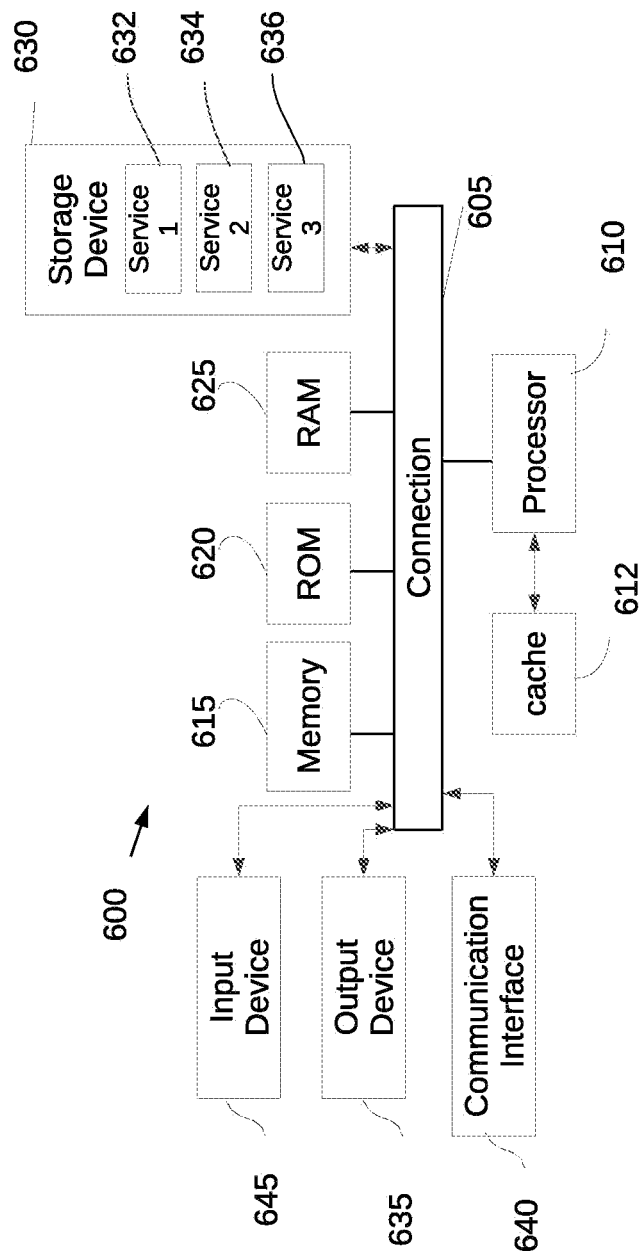
FIG. 7 shows an example of a system for implementing some embodiments of the present technology.

FIG. 7 shows an example of computing system 700, which can be for example any computing device making up any of the entities illustrated in FIG. 2, such as, for example SMF 137 or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A non-transitory computer readable medium comprising instructions stored thereon, wherein the instructions are effective to cause a computing device to perform operations, comprising:
   perform a handover from a source gNB to a target gNB in a network wherein the source gNB has a first control plane connection to at least one SMF via a N3-C interface and a second control plane connection to an AMF via an N2 interface of the AMF, comprising:
   determine to handover to a target gNB by the source gNB;
   send a handover request to the target gNB by the source gNB;
   send information, to the target gNB by the source gNB, regarding the at least one SMF and at least one UPF to which the source gNB is communicating to support a PDU session on behalf of a UE to the target gNB;
   send a handover command to the UE to detach from the source gNB and to attach to the target gNB;
   in response to detachment of the UE from the source gNB and attachment to the target gNB:
     move a second control plane connection over the N2 interface between the AMF and the source gNB to be between the target gNB and the AMF; and
     move the control plane connection over the N3-C interface between the at least one SMF and the source gNB to be between the target gNB and the at least one SMF;
     wherein the target gNB communicates with the at least one SMF through the first control plane, and the target gNB communicates with the AMF through the second control plane.

2. The non-transitory computer readable medium of claim 1, wherein the operations further comprise:
   instruct a UPF associated with the at least one SMF to move an N3-U interface tunnel between the UPF and the source gNB to be between the UPF and the target gNB.

3. The non-transitory computer readable medium of claim 1, wherein the operations further comprise:
   prior to performing the handover from the source gNB to the target gNB, establish secure communications between an SMF and a UE separate from an AMF by:
   receive by the SMF a PDU session request from the AMF that has selected the SMF to service the PDU session, wherein the PDU session request from the AMF includes a PDU session ID;
   send, by the SMF to the source gNB which provides network access to the UE, a session request to initiate the PDU session between the at least one UPF and the UE for user plane traffic, and the N3-C interface between the SMF and the UE for control plane traffic; and
   establish, by the SMF, the N3-C interface between the SMF and the source gNB.

4. A system, comprising:
   a non-transitory computer readable memory storing instructions;
   a processor programmed to cooperate with the instructions to perform operations comprising:

perform a handover from a source gNB to a target gNB in a network wherein the source gNB has a first control plane connection to at least one SMF via a N3-C interface and a second control plane connection to an AMF via an N2 interface of the AMF, comprising:

determine to handover to a target gNB by the source gNB;

send a handover request to the target gNB by the source gNB;

send information, to the target gNB by the source gNB, regarding the at least one SMF and at least one UPF to which the source gNB is communicating to support a PDU session on behalf of a UE to the target gNB;

send a handover command to the UE to detach from the source gNB and to attach to the target gNB;

in response to detachment of the UE from the source gNB and attachment to the target gNB:

move a second control plane connection over the N2 interface between the AMF and the source gNB to be between the target gNB and the AMF; and move the control plane connection over the N3-C interface between the at least one SMF and the source gNB to be between the target gNB and the at least one SMF;

wherein the target gNB communicates with the at least one SMF through the first control plane, and the target gNB communicates with the AMF through the second control plane.

5. The system of claim 4, wherein the operations further comprise:

instruct a UPF associated with the at least one SMF to move an N3-U interface tunnel between the UPF and the source gNB to be between the UPF and the target gNB.

6. The system of claim 5, wherein the operations further comprise:

prior to performing the handover from the source gNB to the target gNB, establish secure communications between an SMF and a UE separate from an AMF by:

receive, by the SMF a PDU session request from the AMF that has selected the SMF to service the PDU session, wherein the PDU session request from the AMF includes a PDU session ID;

send, by the SMF to the source gNB which provides network access to the UE, a session request to initiate the PDU session between the at least one UPF and the UE for user plane traffic, and the N3-C interface between the SMF and the UE for control plane traffic; and establish, by the SMF, the N3-C interface between the SMF and the source gNB.

7. A method comprising: performing a handover from a source gNB to a target gNB in a network wherein the source gNB has a first control plane connection to at least one SMF via a N3-C interface and a second control plane connection to an AMF via an N2 interface of the AMF, comprising:

determining to handover to a target gNB by the source gNB;

sending a handover request to the target gNB by the source gNB;

sending information, to the target gNB by the source gNB, regarding the at least one SMF and at least one UPF to which the source gNB is communicating to support a PDU session on behalf of a UE to the target gNB;

sending a handover command to the UE to detach from the source gNB and to attach to the target gNB;

in response to detachment of the UE from the source gNB and attachment to the target gNB:

moving a second control plane connection over the N2 interface between the AMF and the source gNB to be between the target gNB and the AMF; and moving the control plane connection over the N3-C interface between the at least one SMF and the source gNB to be between the target gNB and the at least one SMF;

wherein the target gNB communicates with the at least one SMF through the first control plane, and the target gNB communicates with the AMF through the second control plane.

8. The method of claim 7, further comprising:

instructing a UPF associated with the at least one SMF to move an N3-U interface tunnel between the UPF and the source gNB to be between the UPF and the target gNB.

9. The method of claim 7, further comprising:

prior to performing the handover from the source gNB to the target gNB, establish secure communications between an SMF and a UE separate from an AMF by:

receiving, by the SMF a PDU session request from the AMF that has selected the SMF to service the PDU session, wherein the PDU session request from the AMF includes a PDU session ID;

sending, by the SMF to the source gNB which provides network access to the UE, a session request to initiate the PDU session between the at least one UPF and the UE for user plane traffic, and the N3-C interface between the SMF and the UE for control plane traffic; and establishing, by the SMF, the N3-C interface between the SMF and the source gNB.

* * * * *